(12) United States Patent
Anderson et al.

(10) Patent No.: US 6,674,939 B1
(45) Date of Patent: Jan. 6, 2004

(54) USING FIBERS AS DELAY ELEMENTS IN OPTICAL TRUE-TIME DELAY DEVICES BASED ON THE WHITE CELL

(75) Inventors: Betty Lise Anderson, Gahanna, OH (US); Stuart A. Collins, Jr., Worthington, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 10/106,177

(22) Filed: Mar. 26, 2002

(51) Int. Cl.[7] ................................................. G02B 6/26
(52) U.S. Cl. ............................ 385/27; 385/28; 385/31; 385/33; 385/35; 385/147; 398/52; 398/53; 398/88
(58) Field of Search ............................ 385/27, 28, 31, 385/33, 35, 133, 134, 147, 30; 398/52, 53, 88

(56) References Cited

U.S. PATENT DOCUMENTS

| | | | |
|---|---|---|---|
| 4,225,938 A | | 9/1980 | Turpin .......................... 708/816 |
| 4,474,434 A | | 10/1984 | Carlsen et al. ............... 359/320 |
| 4,474,435 A | | 10/1984 | Carlsen et al. ............... 359/320 |
| 4,929,956 A | * | 5/1990 | Lee et al. ..................... 342/376 |
| 5,018,816 A | * | 5/1991 | Murray et al. ................. 385/16 |
| 5,117,239 A | * | 5/1992 | Riza ............................. 342/375 |
| 5,319,477 A | | 6/1994 | DeJule et al. .................. 349/65 |
| 5,463,497 A | | 10/1995 | Muraki et al. ................. 359/619 |
| 5,465,175 A | | 11/1995 | Woodgate et al. ............ 359/619 |
| 5,512,907 A | | 4/1996 | Riza ............................. 342/375 |
| 5,623,360 A | * | 4/1997 | Gesell et al. .................. 359/287 |
| 5,936,759 A | | 8/1999 | Buttner ......................... 359/291 |
| 6,014,244 A | | 1/2000 | Chang .......................... 259/281 |
| 6,064,506 A | | 5/2000 | Koops .......................... 359/237 |
| 6,188,817 B1 | | 2/2001 | Goodfellow ................... 385/24 |
| 6,236,506 B1 | | 5/2001 | Cao .............................. 359/484 |
| 6,266,176 B1 | | 7/2001 | Anderson et al. ............. 359/245 |
| 6,388,815 B1 | | 5/2002 | Collins et al. ................. 359/633 |

OTHER PUBLICATIONS

Collins, Jr. et al., Optical True Time Delay for Phased Array Antennas Based on the White Cell, GOMA, Monterey, California, 4 pp. (Mar., 1999).

Anderson et al., Design Advances in Free–Space Optical True–Time Delay Device, PSAA–8, Monterey, California, 4 pp. (Jan., 1998).

Anderson et al., Binary–Counting True Time Delay Generator Using a White Cell Design and Deformable Mirror Devices, LEOS, Orlando, Florida, 2 pp. (Dec., 1998).

Anderson et al., Highly Parallel Optical Device to Produce True Time Delays for Phased Array Antennas, Allerton, 14 pp. (Sep., 1998).

Anderson et al., Optically Produced True–Time Delays for Phased Antenna Arrays, Applied Optics, vol. 36, No. 32, pp. 8493–8503 (Nov., 1997).

(List continued on next page.)

Primary Examiner—Brian Healy
(74) Attorney, Agent, or Firm—Standley & Gilcrest LLP

(57) ABSTRACT

The present invention provides for a delay unit for optically generating time delays in signals comprising: a delay entrance plane, the delay entrance plane comprising at least one row of signal input positions, wherein each signal input position is adapted to receive an optical beam from a source; a delay exit plane, the delay exit plane comprising a respective number of rows of signal output positions, each signal output position is adapted to output the optical beam; and wherein each signal input position of a given row is connected by an optical fiber to a corresponding signal output position, each optical fiber of a given row being the same length as every other optical fiber of that row. Also provided are apparatus and methods for generating time delays in signals.

8 Claims, 6 Drawing Sheets

OTHER PUBLICATIONS

Collins et al., Optics for Numerical Calculation, Proceedings of ICO-11 Conference, Madrid, Spain (1978).

Collins, Numerical Optical Data Processor, SPIE vol. 128, Effective Utilization of Optics in Radar Systems, pp. 313–319 (1977).

Collins et al., Numerical Optical Data Processing, Proceedings of the 1978 International Optical Computing Conference, London, England, pp. 194–197 (Sep., 1978).

Yen et al., Operation of a Numerical Optical Data Processor, International Optical Computing Conference, SPIE Proceedings, vol. 232, 8 pp. (1980).

Freitag et al., A Coherent Optically Controlled Phased Array Antenna System, IEEE Microwave and Guided Wave Letters, vol. 3, No. 9, Sep. 1993, 293–295.

Gpitzpilis et al., Hybrid Electronic Fiber Optic Wavelength–Multiplexed System for True Time–Delay Steering of Phased Array Antennas, Optical Engineering, vol. 31, No. 11, Nov., 1992, pp. 2312–2322.

Cohen et al., Optically Controlled Serially Fed Phased Array Sensor, IEEE Photonics Technology Letters, vol. 8, No. 12, Dec., 1996, pp. 1683–1685.

Fairley, Peter, The Microphotonics Revolution, Mit's Magazine of Innovation, Technology Review, Jul./Aug., 2000, pp. 38–44.

* cited by examiner

USING FIBERS AS DELAY ELEMENTS IN OPTICAL TRUE-TIME DELAY DEVICES BASED ON THE WHITE CELL

The present invention was made with Government support under Grant No. RF#736076. The United States Government may have certain rights to this invention under 35 U.S.C. §200 et seq.

TECHNICAL FIELD OF THE INVENTION

The present invention is in the field of time delay devices, such as those that may be used for the control of phased-array radars, optical signal processing, and optical correlators.

BACKGROUND OF THE INVENTION

In the original patent disclosure, we discussed a binary cell (and higher order exponential cells) for producing optical true time delays. One possible implementation is shown in FIG. 1. On the left is a micro-electromechanical (MEM) device, which in this case is an array of micromirror, each of which can tip to two different angles, ±θ, with respect to the normal to the MEM plane and about a vertical axis. In the same plane as the MEM are an auxiliary mirror and a delay unit. The auxiliary mirror may require a stepped or sawtooth surface to properly image the tilted mirrors of the MEM. The delay unit in this disclosure will become a fiber array. There are two field lenses in front of the MEM plane. On the right we have two pairs of spherical mirrors. The center of curvature (CC) of each mirror is indicated in the figure.

Mirrors A, B, the auxiliary mirror and the MEM plane with a field lens form a White cell. To briefly review the operation, consider light traveling from Mirror B toward the MEM. Suppose every micromirror is tipped to θ. Then the light from Mirror B will return to Mirror A, from which it goes to the Auxiliary Mirror. Light bounces back and forth between B, the MEM, A, and the Aux. Mirror, and is reimaged to a new spot each time it strikes the plane containing the MEM and the auxiliary mirror. We will discuss the spot pattern shortly.

Now suppose that light strikes the MEM after coming from Mirror B, but this time the micro-mirror is tipped to −θ. This directs the light to Mirror E. From E the light goes to the delay unit. It returns from the delay unit, going this time to Mirror F, and then back to the MEM.

We have said that the light forms spots on the MEM plane. We now discuss the spot pattern with the help of FIG. 2. The figure shows the front of the MEM in the middle with the auxiliary mirror to the left and the entrance to the delay unit on the right. We show the spot patterns for three different beams. One beam is represented by the circles, one by the squares, and one by the triangles. The beams are input into the cell via an input turning mirror just below the Auxiliary Mirror. (These could be input via the MEM itself as discussed in other disclosures). Each beam forms a spot labeled "0" there. The input turning mirror is adjusted so as to direct the light to Mirror B. Mirror B images this spot onto the MEM, at a location that is an equal and opposite distance from Mirror B's center of curvature (CC(B)). The new spot is labeled "1" is the first bounce.

If the micromirror is tipped to +θ, the light goes to Mirror A. Mirror A images the first spot, on the MEM, to a second spot on the auxiliary mirror. This appears an equal and opposite distance about A's center of curvature. From the auxiliary mirror the light returns to Mirror B, thence to the MEM, and the process continues. Mirror B forms odd-numbered spots on the MEM and Mirror A forms even numbered spots on the auxiliary mirror.

Now suppose on a given odd-numbered bounce, the MEM micromirror is tipped to −θ. Now the light goes to Mirror E. Mirror E forms the next even-numbered spot, this time on the delay plane, which is a plane in the delay unit that is conjugate to the MEM. In the previous disclosures, light passing through a spot on the delay plane enters the delay unit, propagates some distance into the unit, and is reflected back to the delay plane, where it reforms a spot. For example, light striking the delay plane on bounce 2' propagates for some time and returns back through spot 2'. In the present invention, the spots enter through some point 2' and may exit at a corresponding point in the delay unit output plane. The spots have been discussed in previous disclosures as well.

SUMMARY OF THE INVENTION

The present invention includes a fiber optic delay unit, an apparatus for generating time delays in signals, and methods for optically generating time delays in signals.

In broadest terms, a delay unit for optically generating time delays in signals of the present invention comprises: a delay entrance plane and a delay exit plane. The delay entrance plane comprises at least one row of signal input positions. Each signal input position is adapted to receive an optical beam from a source. The delay exit plane comprises a respective number of rows of signal output positions. Each signal output position is adapted to output an optical beam received by the delay entrance plane. Each signal input position of a given row is connected by an optical fiber to a corresponding signal output position. Each optical fiber of a given row is the same length as every other optical fiber in that row.

An apparatus for optically generating time delays in signals of the present invention comprises an auxiliary mirror, a micro-electro-mechanical device, a delay unit, a first pair of spherical mirrors and a second pair of spherical mirrors. The delay unit used in the apparatus comprises: a delay entrance plane and a delay exit plane. The delay entrance plane comprises at least one row of signal input positions. Each signal input position is adapted to receive an optical beam from a source. The delay exit plane comprises a respective number of rows of signal output positions. Each signal output position is adapted to output an optical beam received by the delay entrance plane. Each signal input position of a given row is connected by an optical fiber to a corresponding signal output position. Each optical fiber of a given row is the same length as every other optical fiber in that row. Each mirror of the first pair of spherical mirrors has a center of curvature. Each mirror of the first pair of spherical mirrors is positioned such that its center of curvature lies between the auxiliary mirror and the micro-electro-mechanical device. Each mirror of the second pair of spherical mirrors has a center of curvature. Each mirror of the second pair of spherical mirrors is positioned such that its center of curvature (or the image of its center of curvature) lies between the micro-electro-mechanical device and the delay unit.

In a preferred embodiment of the present invention, the auxiliary mirror, micro-electro-mechanical device and the entrance and exit planes of the delay unit all lie in a first plane while the first and second pairs of spherical mirrors lie in a second plane. In another preferred embodiment of the present invention, the apparatus further comprises at least one optical element disposed between the first plane and the second plane.

A second apparatus of the present invention for optically generating time delays in signals comprises a micro-electro-mechanical device disposed in a first plane, an auxiliary mirror disposed in a second plane, the entrance and exit planes of a delay unit disposed in the second plane, and a pair of lenses disposed between the delay unit and the micro-electro-mechanical device. The delay unit of this second apparatus comprises: a delay entrance plane and a delay exit plane. The delay entrance plane comprises at least one row of signal input positions. Each signal input position is adapted to receive an optical beam from a source. The delay exit plane comprises a respective number of rows of signal output positions. Each signal output position is adapted to output an optical beam received by the delay entrance plane. Each signal input position of a given row is connected by an optical fiber to a corresponding signal output position. Each optical fiber of a given row is the same length as every other optical fiber in that row.

In a preferred embodiment, the apparatus further comprises at least one optical element disposed between the first plane and the second plane.

A method of the present invention for optically generating time delays in signals comprises the steps of: modulating an input signal onto an optical beam, passing the optical beam through an apparatus for optically generating time delays, and down-converting the optical beam to an output signal. The apparatus comprises an auxiliary mirror, a micro-electro-mechanical device, a delay unit, a first pair of spherical mirrors and a second pair of spherical mirrors. The delay unit comprises: a delay entrance plane and a delay exit plane. The delay entrance plane comprises at least one row of signal input positions. Each signal input position is adapted to receive an optical beam from a source. The delay exit plane comprises a respective number of rows of signal output positions. Each signal output position is adapted to output an optical beam received by the delay entrance plane. Each signal input position of a given row is connected by an optical fiber to a corresponding signal output position. Each optical fiber of a given row is the same length as every other optical fiber in that row. Fibers in each row may have a different length than fibers of any other row. Each mirror of the first pair of spherical mirrors has a center of curvature. Each mirror of the first pair of spherical mirrors is positioned such that its center of curvature lies between the auxiliary mirror and the micro-electro-mechanical device. Each mirror of the second pair of spherical mirrors has a center of curvature. Each mirror of the second pair of spherical mirrors is positioned such that its center of curvature lies between the micro-electro-mechanical device and the delay unit.

A second method of the present invention for optically generating time delays in signals comprises the steps of: modulating an input signal onto an optical beam; passing the optical beam through an apparatus for optically generating time delays; and down-converting the optical beam to an output signal. The apparatus comprises: a micro-electro-mechanical device disposed in a first plane; an auxiliary mirror disposed in the first plane; a delay unit disposed in a second plane; and a pair of lenses disposed between the delay unit and the micro-electro-mechanical device. The delay unit comprises: a delay entrance plane and a delay exit plane. The delay entrance plane comprises at least one row of signal input positions. Each signal input position is adapted to receive an optical beam from a source. The delay exit plane comprises a respective number of rows of signal output positions. Each signal output position is adapted to output an optical beam received by the delay entrance plane. Each signal input position of a given row is connected by an optical fiber to a corresponding signal output position. Each optical fiber of a given row is the same length as every other optical fiber in that row.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
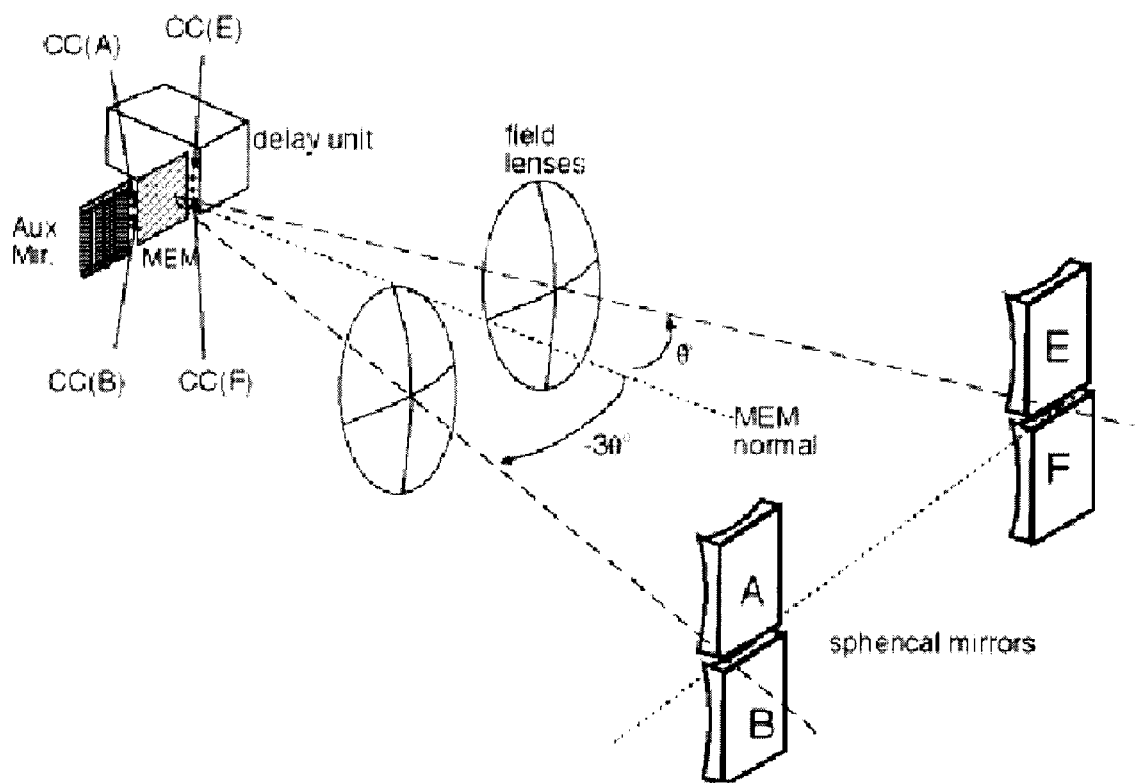
FIG. 1 provides an overall view of a binary optical true time delay device.
Figure 2:
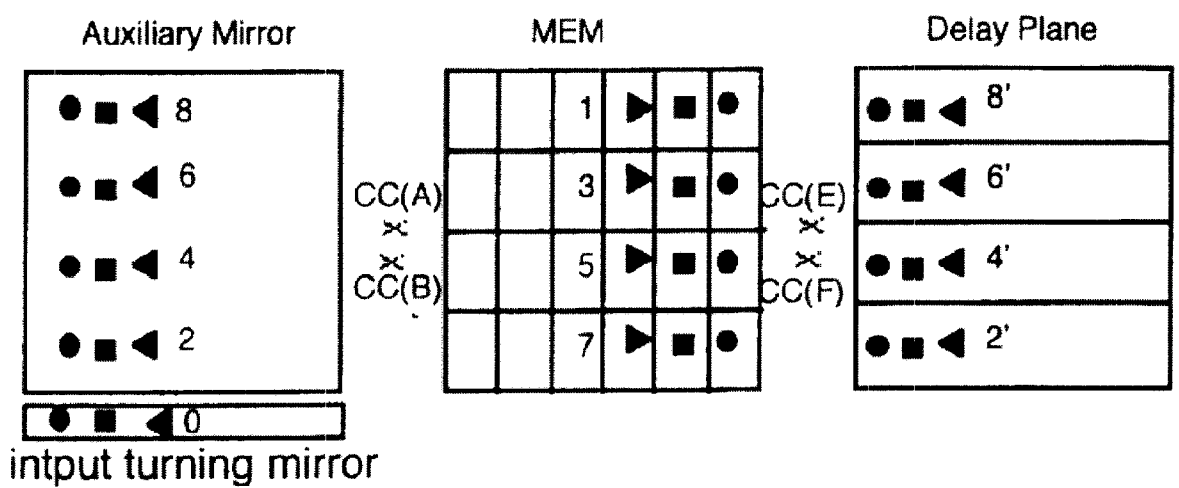
FIG. 2 shows the spot pattern for three beams making eight bounces.
Figure 3:
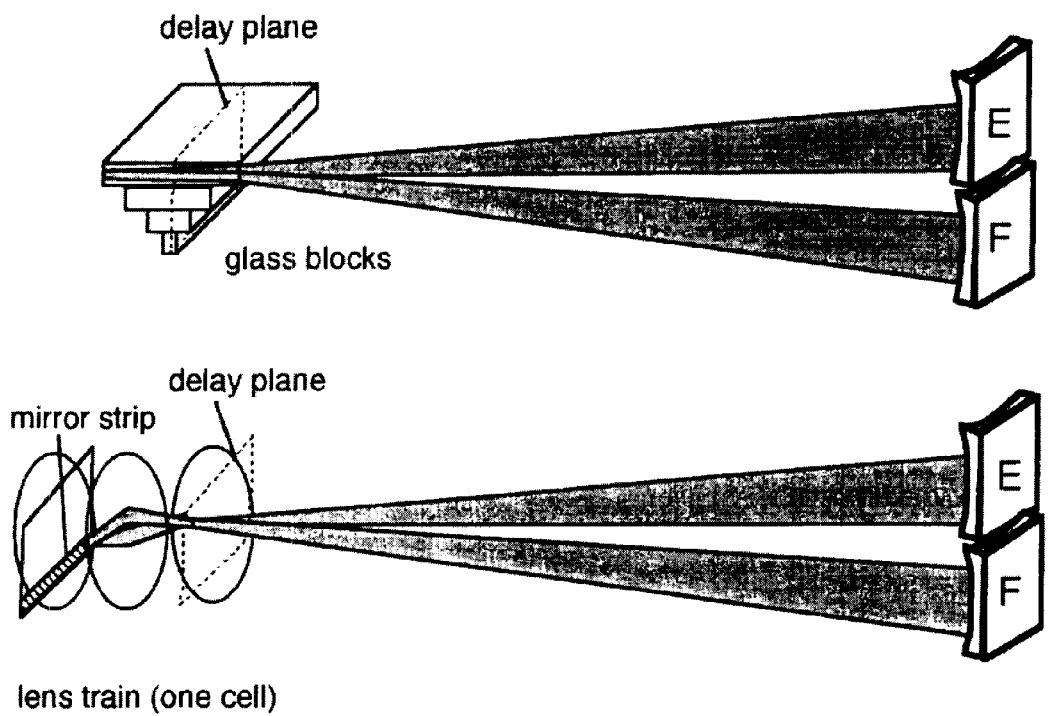
FIG. 3 illustrates delay units of the prior art.

In previous designs, the delay unit consisted of a set of glass blocks or a lens train, as shown in FIG. 3. It is important to notice the while light passes through the same spot entering and exiting the delay plane on a given bounce, it does so at different angles. If, say, the glass blocks are replaced by rows of optical fibers (or other waveguides that are not lens waveguides), then a modification is necessary. Light entering a fiber must do so parallel to the fiber's axis (or close to it) to maximize the coupling efficiency, and light emitted from the fiber will also be traveling in a direction close to parallel to the fiber's axis.

Figure 4:
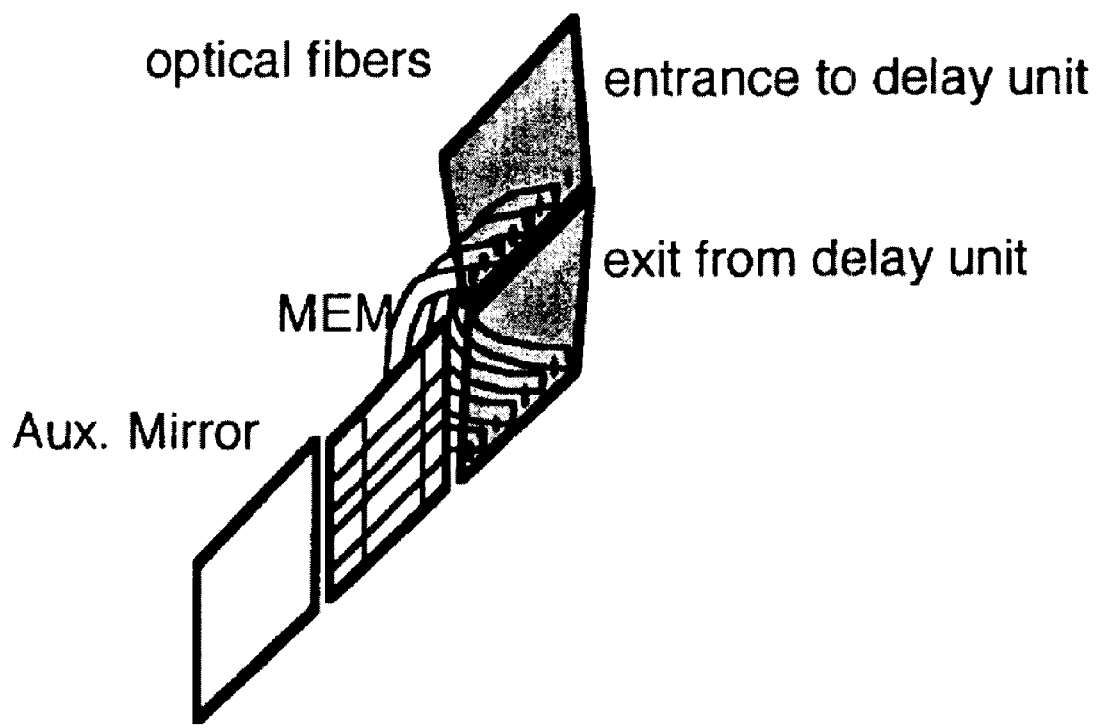
FIG. 4 shows a delay unit of the present invention.

We therefore break up the delay plane into two planes, one a delay entrance plane and one a delay exit plane. This is shown in FIG. 4. Here light coming from Mirror E forms a spot on the entrance plane, and enters an appropriate fiber. The length of the fiber will be different for each row (compare to the glass blocks). The light exits the fiber in the exit plane shown in the figure. The entrance plane is tipped slightly so as to be perpendicular to the axis of Mirror E, and the exit plane is tipped so as to be perpendicular to the axis of Mirror F.

Figure 5:
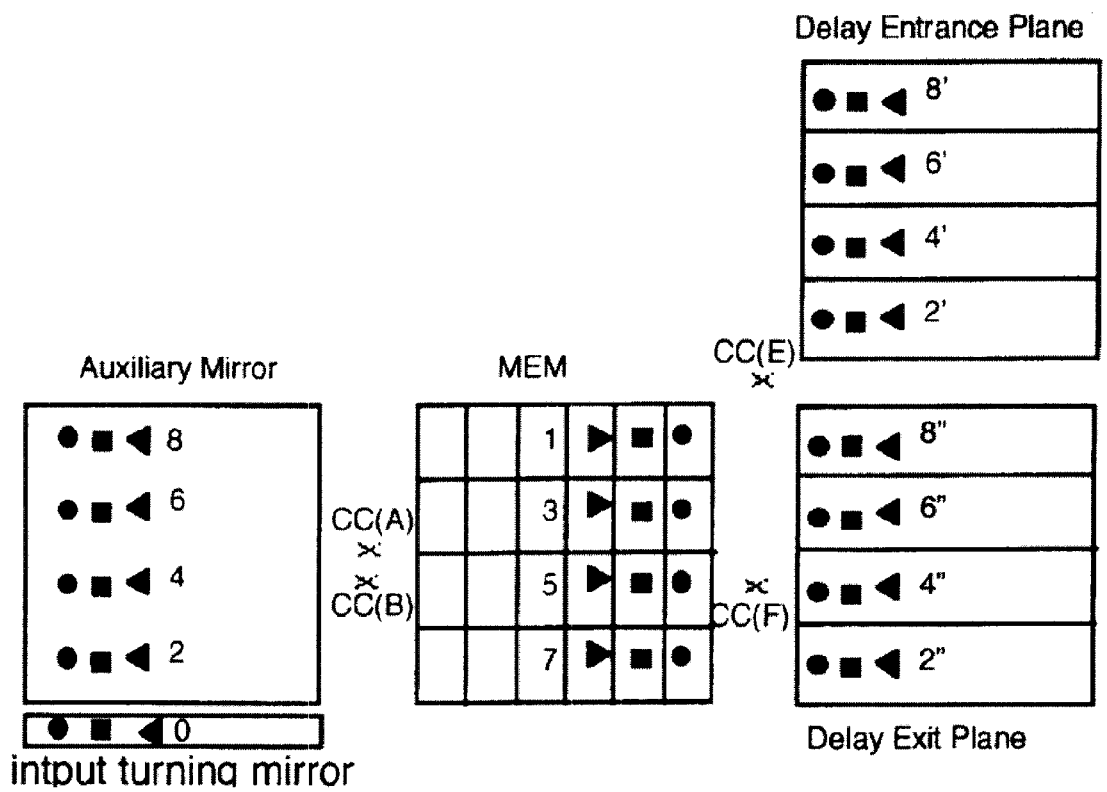
FIG. 5 illustrates the alignment of the spherical mirrors and spot patterns for a fiber implementation of a delay unit.

FIG. 5 shows the centers of curvature for the spherical mirrors. Suppose a beam is switched toward the delay element on bounce 3 on the MEM. The light goes to Mirror E, which forms a spot on the entrance delay plane at point 4. One end of a fiber of appropriate length is located here. The other end is at point 4" on the delay exit plane. Light exiting the fiber goes to mirror F, which images the fiber facet back onto the MEM, this time at point 5.

Figure 6:
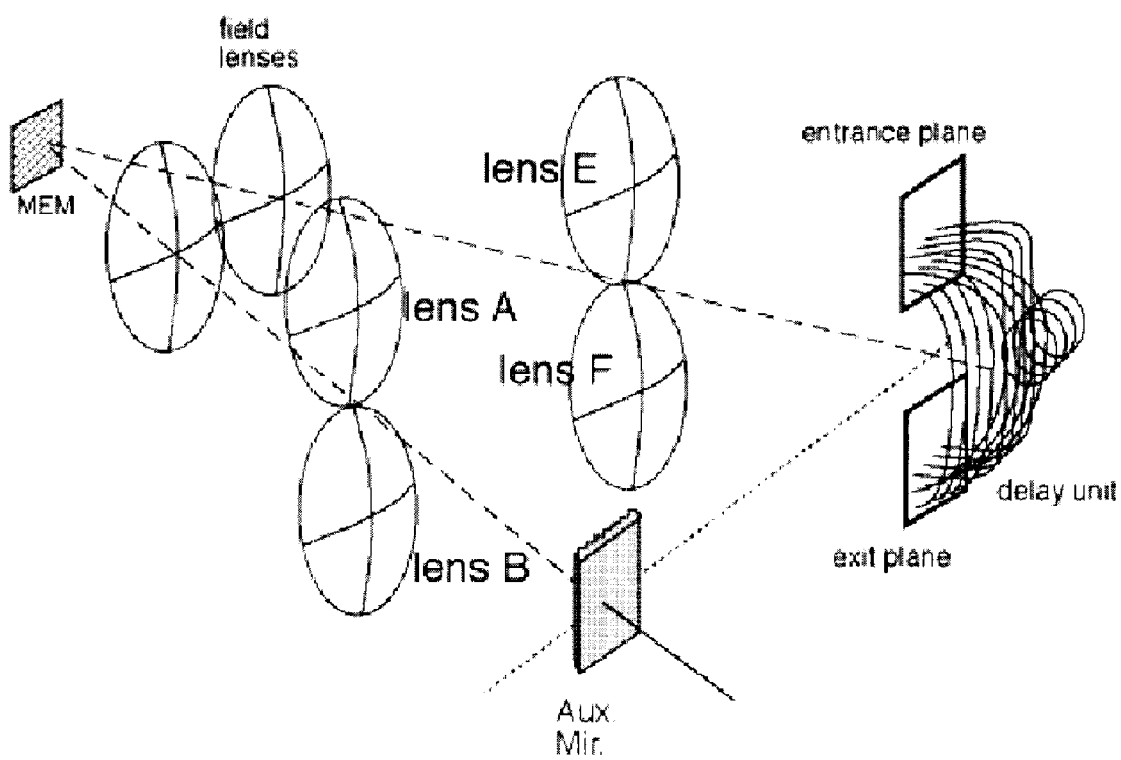
FIG. 6 illustrates an alternative arrangement of delay fibers, in which a White Cell is unfolded.

Another way of arranging the fiber planes is shown in FIG. 6. Here the light going to the delay unit passes through a lens E (replacing the spherical mirror E), and is imaged onto the entrance plane of the fiber delay unit. The light emerging from the fibers passes through Lens F, which images the spots back onto the MEM.

Arrangements of fibers similar to those presented here can be used in the optical interconnection device (disclosed separately), in which case the fibers are used to shift the spots by an appropriate amount, rather than to delay the light beams.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims, which are incorporated herein by reference.

What is claimed is:

1. A delay unit for optically generating time delays in signals comprising:
    a delay entrance plane, said delay entrance plane comprising at least one row of signal input positions, each said signal input position adapted to receive an optical beam from a source;
    a delay exit plane, said delay exit plane comprising a respective number of rows of signal output positions, each said signal output position adapted to output said optical beam; and
    wherein each said signal input position of a given row is connected by an optical fiber to a corresponding signal output position, each said optical fiber of a given row being the same length as every other optical fiber of said given row.

2. An apparatus for optically generating time delays in signals comprising:
    an auxiliary mirror;
    a micro-electro-mechanical device;
    a delay unit, said delay unit comprising:
        a delay entrance plane, said delay entrance plane comprising at least one row of signal input positions, each said signal input position adapted to receive an optical beam from a source;
        a delay exit plane, said delay exit plane comprising a respective number of rows of signal output positions, each said signal output position adapted to output said optical beam; and
        wherein each said signal input position of a given row is connected by an optical fiber to a corresponding signal output position, each said optical fiber of a given row being the same length as every other optical fiber of said given row; and
    a first pair of spherical mirrors, each said spherical mirror of said first pair of spherical mirrors having a center of curvature, said first pair of spherical mirrors positioned such that said center of curvature of each said spherical mirror lies between said auxiliary mirror and said micro-electro-mechanical device; and
    a second pair of spherical mirrors, each said spherical mirror of said second pair of spherical mirrors having a center of curvature, said second pair of spherical mirrors positioned such that said center of curvature of each said spherical mirror lies between said micro-electro-mechanical device and said delay unit.

3. An apparatus according to claim 2 wherein said auxiliary mirror, said micro-electro-mechanical device, said delay entrance plane and said delay exit plane lie a first plane and said first pair of spherical mirrors and said second pair of spherical mirrors lie in a second plane.

4. An apparatus according to claim 3 further comprising at least one optical element disposed between said first plane and said second plane.

5. An apparatus for optically generating time delays in signals comprising:
    a micro-electro-mechanical device disposed in a first plane;
    an auxiliary mirror disposed in said first plane;
    a delay unit disposed in a second plane, said delay unit comprising:
        a delay entrance plane, said delay entrance plane comprising at least one row of signal input positions, each said signal input position adapted to receive an optical beam from a source;
        a delay exit plane, said delay exit plane comprising a respective number of rows of signal output positions, each said signal output position adapted to output said optical beam; and
        wherein each said signal input position of a given row is connected by an optical fiber to a corresponding signal output position, each said optical fiber of a given row being the same length as every other optical fiber of said given row; and
    a pair of lenses, said pair of lenses disposed between said delay unit and said micro-electro-mechanical device.

6. An apparatus according to claim 5 further comprising at least one optical element disposed between said first plane and said second plane.

7. A method for optically generating time delays in signals, said method comprising the steps of:
    modulating an input signal onto an optical beam;
    passing said optical beam through an apparatus for optically generating time delays, said apparatus comprising:
        an auxiliary mirror;
        a micro-electro-mechanical device;
        a delay unit, said delay unit comprising:
            a delay entrance plane, said delay entrance plane comprising at least one row of signal input positions, each said signal input position adapted to receive an optical beam from a source;
            a delay exit plane, said delay exit plane comprising a respective number of rows of signal output positions, each said signal output position adapted to output said optical beam; and
            wherein each said signal input position of a given row is connected by an optical fiber to a corresponding signal output position, each said optical fiber of a given row being the same length as every other optical fiber of said given row; and
        a first pair of spherical mirrors, each said spherical mirror of said first pair of spherical mirrors having a center of curvature, said first pair of spherical mirrors positioned such that said center of curvature of each spherical mirror lies between said auxiliary mirror and said micro-electro-mechanical device; and
        a second pair of spherical mirrors, each said spherical mirror of said second pair of spherical mirrors having a center of curvature, said second pair of spherical mirrors positioned such that said center of curvature of each spherical mirror lies between said micro-electro-mechanical device and said delay unit; and
    down-converting said optical beam to an output signal.

8. A method for optically generating time delays in signals, said method comprising the steps of:

modulating an input signal onto an optical beam;

passing said optical beam through an apparatus for optically generating time delays, said apparatus comprising:
- a micro-electro-mechanical device disposed in a first plane;
- an auxiliary mirror disposed in a second plane;
- a delay unit disposed in said second plane, said delay unit comprising:
  - a delay entrance plane, said delay entrance plane comprising at least one row of signal input positions, each said signal input position adapted to receive an optical beam from a source;
  - a delay exit plane, said delay exit plane comprising a respective number of rows of signal output positions, each said signal output position adapted to output said optical beam; and
  - wherein each said signal input position of a given row is connected by an optical fiber to a corresponding signal output position, each said optical fiber of a given row being the same length as every other optical fiber of said given row; and
- a pair of lenses, said pair of lenses disposed between said delay unit and said micro-electro-mechanical device;

down-converting said optical beam to an output signal.

* * * * *